US005611743A

United States Patent [19]

Bielfeldt

[11] Patent Number: 5,611,743
[45] Date of Patent: Mar. 18, 1997

[54] DEVICE FOR GUIDING STEEL BELT ALONG AXIS OF PRESS

[75] Inventor: Friedrich B. Bielfeldt, Pähl, Germany

[73] Assignee: Maschinenfabrik J. Dieffenbacher GmbH & Co., Eppingen, Germany

[21] Appl. No.: 402,237

[22] Filed: Mar. 10, 1995

[30] Foreign Application Priority Data

Mar. 10, 1994 [DE] Germany .......................... 44 08 099.9

[51] Int. Cl.$^6$ .......................... F16H 7/18
[52] U.S. Cl. .......................... 474/101; 100/151
[58] Field of Search .......................... 474/101; 100/41, 100/53, 93 P, 151–154, 915

[56] References Cited

U.S. PATENT DOCUMENTS

| | | | |
|---|---|---|---|
| 3,938,927 | 2/1976 | Brinkmann et al. | 425/373 |
| 4,043,733 | 8/1977 | de Mets | 425/371 |
| 4,290,248 | 9/1981 | Kemerer et al. | 52/309.16 |
| 4,541,889 | 9/1985 | Held | 156/583.5 |
| 5,182,986 | 2/1993 | Bielfeldt | 100/41 |
| 5,253,571 | 10/1993 | Bielfeldt et al. | 100/41 |
| 5,323,696 | 6/1994 | Bielfeldt et al. | 100/154 |
| 5,333,541 | 8/1994 | Bielfeldt et al. | 100/41 |

FOREIGN PATENT DOCUMENTS

| | | |
|---|---|---|
| 26 43 346.5 | 3/1978 | Germany . |

*Primary Examiner*—Roger J. Schoeppel
*Attorney, Agent, or Firm*—Foley & Lardner

[57] ABSTRACT

A measuring and control device for guiding a steel belt along a longitudinal axis of a continuously operating press includes a driving drum and a reversing drum for guiding the steel belt. Two measuring columns are respectively anchored in a foundation and spaced longitudinally from either longitudinal side of one end face of the continuously operating press. Four path sensors are disposed on the measuring columns, such that each of the path sensors measure a spacing between the sensor and a point on the continuously operating press. Pressure cylinder-piston arrangements are disposed on the driving drum and the reversing drum to correct the course of the steel belt. Variables for altering the course of said steel belt include the spacings measured by the path sensors.

10 Claims, 3 Drawing Sheets

DEVICE FOR GUIDING STEEL BELT ALONG AXIS OF PRESS

BACKGROUND OF THE INVENTION

The invention relates to a measuring and control device for guiding a steel belt along the longitudinal axis of a continuously operating press for the production of particle boards, fiber boards or similar wood boards and plastic boards.

In continuously operating presses of this type, as the presses are lengthened to attain greater output capacities, the adjustment of the steel belt necessary for straight-line running about the longitudinal axis cannot be accomplished too easily. The limit lies roughly at a length of 28 meters for a continuously operating press. As the lengths increase towards 40 meters and more, for example, a) slight irregularities in the lubrication of the steel belts and rolling rods or b) uneven bulk-density distribution have a disruptive effect upon on-line adjustment. Therefore, it is not always possible to redirect the steel belts into the middle by angular adjustment of the driving drum and reversing drum axes as according to German Patent Specification 26 43 346.

In the press/heating platen region, particularly in the first third of the high-pressure area, the steel belts are tightly clamped as in a vice. As a result, whenever the drum axes are adjusted by means of the adjustment path, an elongation partially greater than in the clamped region is obtained in the entry region because the steel belt is not clamped here. The same applies to the exit strand. As a result, in the high-pressure region of the presses which are becoming longer the elongation in the clamped zone is small relative to the entry and exit sections. Therefore, in order to prevent one-sided overexpansion of the steel belts as the course of the steel belt is adjusted, the continuously operating press has to be halted and all the inconveniences and disadvantages associated with halting of the press have to be endured.

In order to overcome and resolve these difficulties, German Offenlegungsschrift 40 17 791 discloses a process by which the course of the steel belt relative to the longitudinal center axis can be adjusted during running of the continuously operating press without any one-sided overexpansion of the steel belt, and a device in which this process can be implemented.

According to the solution discovered, the axial adjustment is carried out on one of the longitudinal sides, by an angle beta, on the reversing drum and/or driving drum axes, at the start of an adjustment of the press ram; the press ram is transported by the short-stroke pressure cylinder in the high-pressure region out of its horizontal position into an oblique position such that, on the left or right in the direction of entry, a pressure profile or path profile is set. This process and device have become established for adjusting the course of the steel belt for large press lengths.

The above measuring and control devices are unable however to cope with temperature differences, for example, temperature differences resulting from thermodynamic air movements occurring within a factory hangar on the left or right of the longitudinal sides of the press, which give rise to greater differences in linear expansion. Where a temperature difference of about 10° C. exists, for example, from one longitudinal side to the other, a difference in length of approximately 6 millimeters from one longitudinal side to the other is obtained for a free expansion length L of about 50 meters.

SUMMARY OF THE INVENTION

One object of the invention is to improve the measuring and control device for the straight-line running of the steel belts in a continuously operating press such that the different linear expansions of the control zone which arise as a result of different temperature influence on the two longitudinal sides have no additional adverse influence upon the straight-line running of the steel belts.

This object is accomplished with a measuring and control device for guiding a steel belt along a longitudinal axis of a continuously operating press for the production of particle boards, fiber boards or similar wood boards and plastic boards. The device includes flexible, endless steel belts which transmit pressing pressure and pull materials to be pressed through the press, are guided via driving drums and reversing drums around an upper and a lower press beam and are supported with an adjustable press nip against heating platens on press beams via rolling supporting elements which revolve along with the steel belts and are guided with their axes transverse to the running direction of the belt. The axes of the driving drum and the reversing drum are altered longitudinally by pressure cylinder-piston arrangements disposed on the driving drums and reversing drums, whenever control pulses from path sensors disposed to the side of the steel belts reach the control device. On one end face of the continuously operating press, at both longitudinal sides, a measuring column is respectively anchored in the foundation at a spacing from the two side plates of the continuously operating press. This spacing is registered by four path sensors disposed on the measuring columns and fed as an additional control variable into the control circuit and automatic control system of the control device for the adjustment of course of the steel belt whenever the length L at the corner points L1, L2, L3 and L4 changes from the thermal zero point.

An advantage is that the different linear expansions which arise from different temperature influences on the control zone V between the driving drums and reversing drums, for example, at the four corner points of the supporting girders, are automatically corrected by a thermal expansion compensation. As a result, the steel-belt course automatic control system, which reacts to any adverse action of the pressing stock, operates smoothly without any additional disturbances, for example, those disturbances resulting from the thermal influencing of a changing reference zone, such that the straight-line running of the steel belts remains constantly safeguarded.

A further advantage of the control device according to the invention is that the thermal sliding motions, in contrast to known continuously operating presses, are effected purely under the weight of the individual press regions (individual press beam modules) upon the sliding bodies/surfaces assigned to them.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred exemplary embodiments of the invention, and, together with the general description given above and the detailed description of the preferred embodiments given below, serve to explain the principles of the invention.

Further features and advantages of the invention derive from the claims and from the following description of an illustrative embodiment with reference to the drawing, in which:

DETAILED DESCRIPTION OF THE PREFERRED EMBODIMENT

Figure 1:
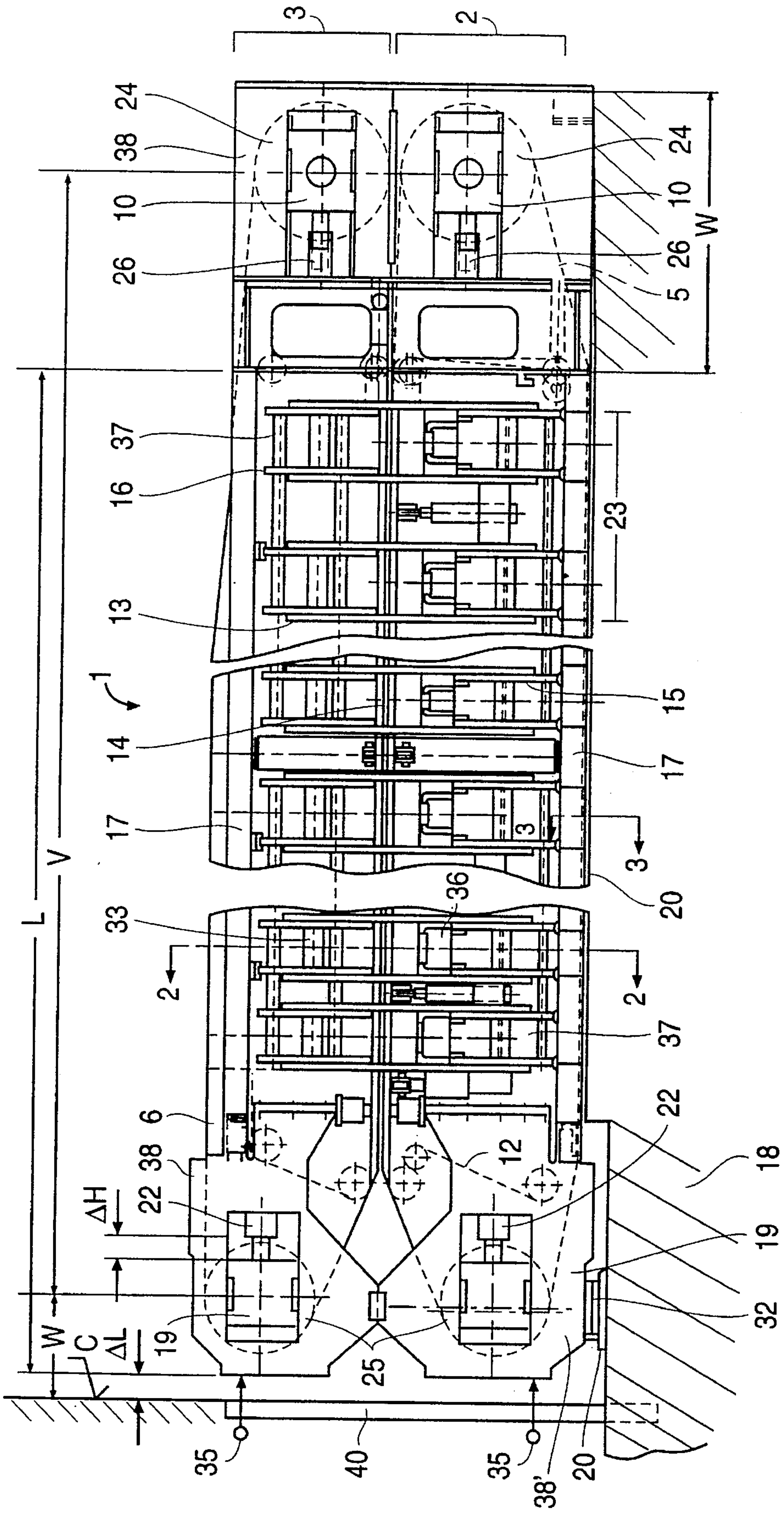
FIG. 1 is a side view of the measuring and control device according to the invention implemented on a continuously operating press.
Figure 2:
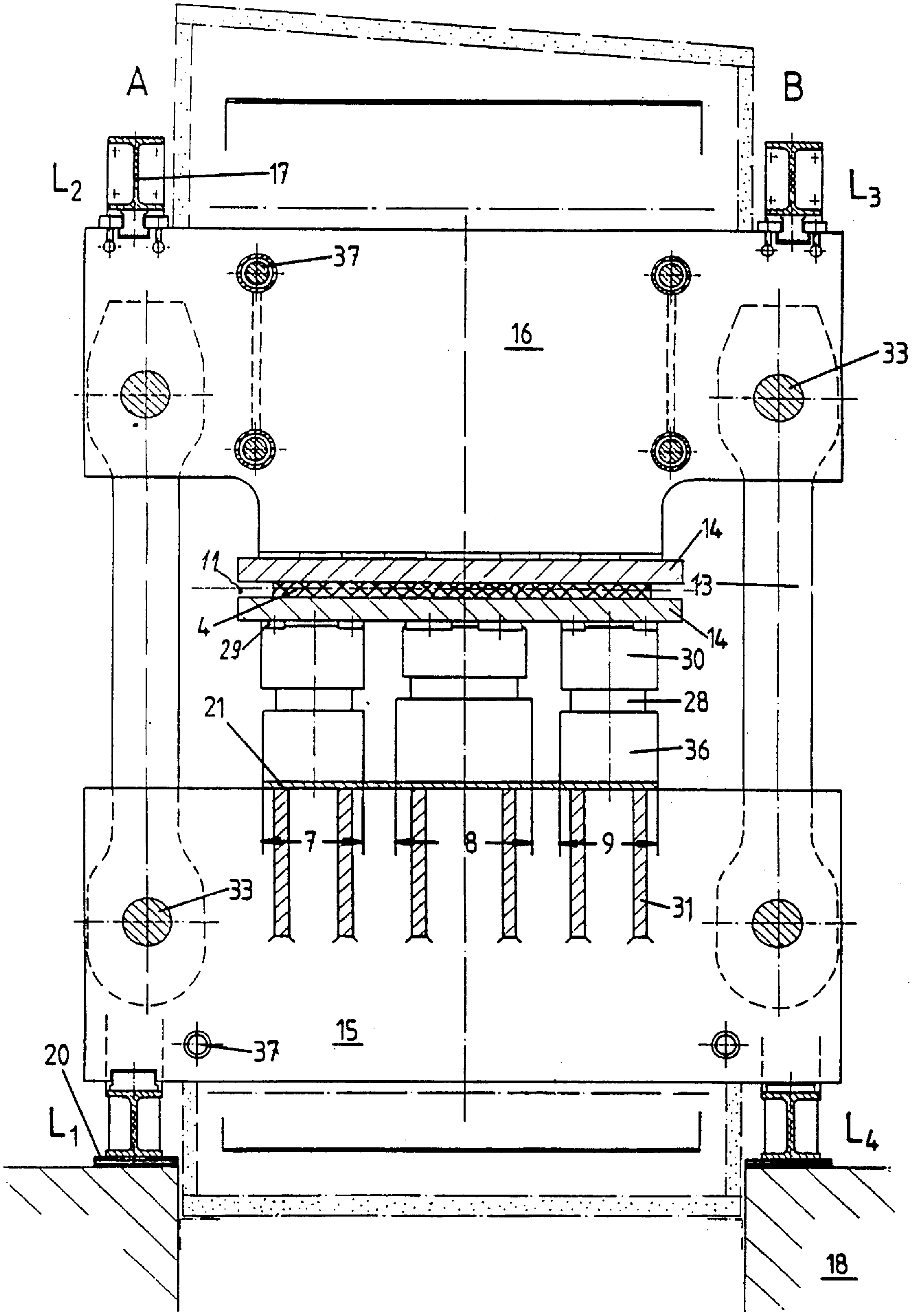
FIG. 2 is a front view of the measuring and control device according to FIG. 1, section 2—2.
Figure 3:
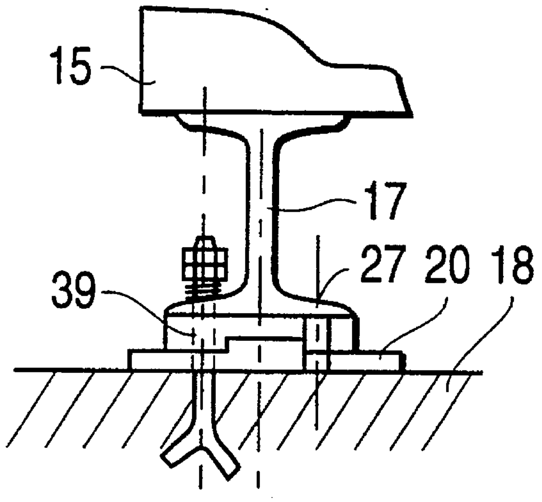
FIG. 3 is a partial front view of the support of the continuously operating press according to FIG. 1, section 3—3.

According to the invention, a control zone V, as represented in FIGS. 1 to 3, changes under different temperature influences between driving and reversing drums 24 and 25, i.e., between the exit and entry region. The deviation of lower and upper steel belts 5 and 6 along a pressing zone L (in terms of left/right deviation) from the middle of press 1 is brought about essentially by the driving drums 24 mounted in exit crossmembers 10. Deviations from the central course of the steel belt are hydraulically corrected by means of hydraulic actuators 22 and 26, which are respectively assigned to outer side plates or bearing plates 38. The plus/minus deviation from the longitudinal axis of the press 1 of the steel belt 6 according to FIG. 2 is scanned by means of lateral sensors (not represented) directly on the steel belt 6 along the pressing zone L. The use of additional control drums in the return travel of the steel belts has the effect of helping to adjust the course of the steel belt.

As soon as the belt deviates from its central course because of the temperature differences between the two longitudinal sides A and B along the pressing zone L, a change in the control zone V in terms of the centering spacing between the entry drums 25 and exit drums 24 must automatically result. As a result, the aforementioned control pattern for keeping the steel belts 5 and 6 centrally positioned along the pressing zone L is automatically disturbed since the control zone V has changed relative to the reference plane C.

In order to correct the course of the steel belt, the most important hydraulic actuators 26 (four cylinders) for the horizontal angular adjustment of the drum axes for the driving drums 24 are housed in the exit crossmembers 10. Both exit crossmembers 10 are screwed positively together in a mechanical joint and are firmly anchored, via a fixed zone W, to a foundation base 18. Four supporting girders 17 having corner points L1, L2, L3 and L4 are connected, together with entry crossmembers 19, horizontally in positive engagement to the exit crossmembers 10. Individual beams 23 are disposed between the four supporting girders 17 and are connected at their four outer corner points in the region L1, L2, L3 and L4, in non-positive or sliding engagement, to these supporting girders 17. The full weight of the continuously operating press 1, including the entry crossmembers 19, is supported on the lower supporting girders 17.

The lower supporting girders 17 in the region L1 and L4 and lower supporting brackets 32 on which the entry crossmembers 19 are supported slide relative to the foundation 18 on sliding bodies 20 provided for this purpose, so that the press 1 is connected to the foundation base 18 such that it is in overall accord, in terms of thermal expansion, with the fixed zone W. For this purpose, long holes 27 are provided in the lower supporting girders 17 and supporting brackets 32. The lower supporting girders 17 and the lower supporting brackets 32 are connected non-positively to the sliding bodies 20 and to the foundation base 18 respectively by means of spring-pretensioned stone bolts 39.

Figure 4:
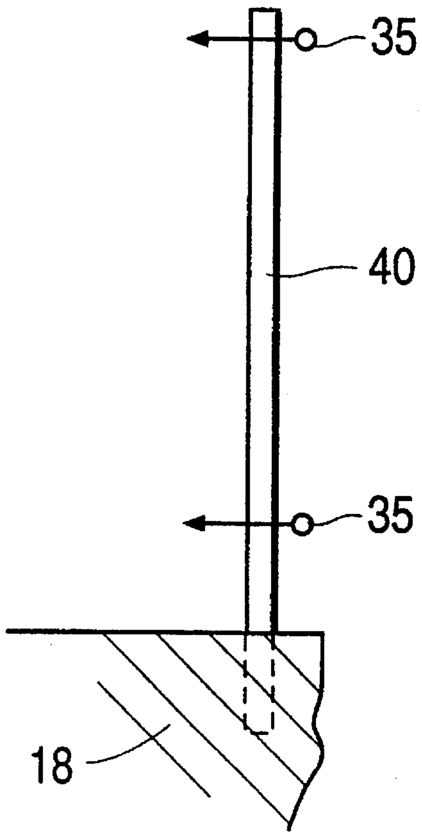
FIG. 4 is a side view of a portion of the invention, viewed from a direction opposite that of FIG. 1.

According to the invention, at the end face in front of the entry crossmembers 19 there are disposed two measuring columns 40, respectively on the left before the corner points L1 and L2 and on the right before the corner points L3 and L4. These measuring columns 40 are anchored firmly in the foundation 18. Opposite the four corner points L1, L2, L3 and L4, there are disposed on these measuring columns 40 four path sensors 35, (two of which are shown in FIG. 1 and two of which are shown in FIG. 4) whereby respective changes in the reference zone, for example, changes resulting from different thermal expansions, are registered along the pressing zone L. The control zone V is calibrated with the spacing X of the middle axes of the reversing drums 25 from the reference plane C as a reference variable X for the adjustment of the driving drums 24.

As soon as changes are produced in the reference spacing X from the reference plane C at the four corner points L1, L2, L3 and L4, the position of the four entry crossmembers 19 of the reversing drums 25 is adjusted, in terms of their reference spacing X from the reference plane C, by means of the four hydraulic actuators 22, In a closed automatic control system, between the measured deviation Delta X, the predefined zeroed reference spacing X is automatically corrected by means of the hydraulic actuators 22, and the different linear expansions in the corner regions L1, L2, L3 and L4 are corrected as disturbance variables such that an automatic thermal expansion compensation is obtained, and the automatic control systems are able to operate properly without these additional disturbance influences.

The continuously operating press 1, in which the measuring and control device according to the invention is used, comprises according to FIGS. 1 and 2, in its principal parts, upper and lower individual beams 23 and tiebars 13 which positively connect them. The tiebars 13 can be quickly released by means of push-in pins 33. The individual beams 23 comprise web plates 15 and 16 and ribs 31 which connect these. Four web plates respectively 15 and 16 are connected by means of tie rods 37 to form an individual beam 23. The tie rods represent, by virtue of the line-up and fitting of press/heating platens 14, the length of the press beams 2 and 3. At the end faces of the press beams 2 and 3 there are fitted side plates 38, serving as an anchorage and bearing point for the driving drums 24, the reversing drums 25 and the entry systems for rolling rods 12.

From FIG. 1, it can further be soon how the reversing drums 25 form an entry nip and how the rolling rods, which are guided with the stool bolts 5 and 6 around the press beams 2 and 3, are supported against the press/heating platens 14. The revolving rolling rods 12, as an example of a rolling support, are disposed between the press/heating platens 14 and the stool belts 5 and 6 such that they roll along with the heating platens 14 and the steel belts 5 and 6. The pressing stock 4 is pulled through the press nip 11 with the steel belts 5 and 6, which are driven by the driving drums 24, and is pressed into boards.

Hydraulic cylinder-piston arrangements 7, 8 and 9, with pressure pistons 28 and cylinders 36, are disposed beneath the press/heating platen 14 and are supported on supporting plates 21 of the lower press beam 2. The pressure pistons 28 are respectively assigned supporting crossmembers 30, which herein transmit the centrally acting hydraulic forces from the pressure pistons 28 to the supporting crossmembers 30 and via supporting bodies 29 to the lower press/heating platen 14. The pretensioning forces of the steel belts 5 and 6 between the entry and exit drum systems are absorbed as compressive force by the four I-section girders 17.

In the illustrative embodiment according to FIG. 1, the fixed sons W is provided for the horizontal anchorage of the continuously operating press 1. The continuously operating press 1 is positioned and firmly anchored, by means of the pressing force-frame construction and the side plates 38 respectively, in the form of a fixed sons W, on the lower I-section girders 17 acting as supporting girders or supporting construction. The lower web plates 15 of the individual beams 23 are supported on the supporting girders 17, The sliding bodies 20 for the bearing support of the supporting girders 17 (I-section girders) consist of slidable plastic and/or of grey cast iron having a high graphite content.

In the event of a different longitudinal thermal expansion of the left longitudinal side A relative to the right longitudinal side B of the control sons V, the sides expand freely from the thermal zero point such that the fixed sons W is shifted forward against the direction of transport of the pressing stock 4. The pressing force-frame construction includes the upper press beam 3 (upper individual beams 23) tied to the lower press beam 2 (lower individual beam 23) by the tiebars 13.

In presses which are extra-long, there is the possibility of disposing the fixed zone W in the middle of the press 1. For this purpose, two measuring columns 40 shall also be disposed at the end face of the continuously operating press 1 and shall likewise be anchored at the reference spacing X in the foundation 18. With this embodiment, the longitudinal expansion or shrinkage of the pressing force-frame construction is registered against and with the direction of transport, since the longitudinal expansion of the press 1 from the fixed zone W occurs both in and against the direction of transport.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A measuring and control device for guiding a steel belt along a longitudinal axis of a continuously operating press for the production of particle boards, fiber boards or similar wood boards and plastic boards, comprising:

flexible, endless steel belts which transmit pressing pressure and pull materials to be pressed through the press, are guided via driving drums and reversing drums around an upper and a lower press beam and are supported with an adjustable press nip against heating platens on press beams via rolling supporting elements which revolve along with the steel belts and are guided with their axes transverse to the running direction of the belt;

pressure cylinder-piston arrangements for altering axes of the driving drum and the reversing drum, whenever control pulses from path sensors disposed to the side of the steel belts reach the control device;

a measuring column respectively anchored in a foundation on an end face of the continuously operating press, at both longitudinal sides, at a spacing from two side plates of the continuously operating press; and path sensors disposed on each measuring column for measuring a spacing from four corner points of the end face of the continuously operating press and feeding the spacing as an additional control variable into a control circuit and automatic control system of the control device for the adjustment of course of the steel belt, whenever the spacing at the corner points differs from a thermal zero point.

2. The measuring and control device as claimed in claim 1, wherein the continuously operating press is firmly anchored to the foundation as a horizontal fixture in a fixed sons, and wherein from the fixed zone to a free longitudinal expansion or shrinkage, a pressing force-frame construction of the continuously operating press is positioned between four supporting girders and is mounted on sliding bodies with lower supporting girders against the foundation and side plates.

3. The measuring and control device as claimed in claim 2, wherein the sliding bodies include a slidable material selected from the group consisting of plastic and grey cast iron having a high graphite content.

4. The measuring and control device as claimed in claim 3, wherein, in an arrangement of the fixed zone in the middle of the press, two measuring columns are additionally anchored in the foundation at an exit end of the press with a reference spacing, to enable the longitudinal expansion or shrinkage of the pressing force-frame construction to be registered in a path-sensory manner against and with the direction of transport.

5. A measuring and control device for guiding a steel belt along a longitudinal axis of a continuously operating press, comprising:

a driving drum and a reversing drum for guiding said steel belt;

measuring columns respectively anchored in a foundation and spaced longitudinally from either longitudinal side of an end face of the continuously operating press;

path sensors disposed on the measuring columns, each of the path sensors measuring a spacing from a point on the continuously operating press; and pressure cylinder-piston arrangements disposed on said driving drum and said reversing drum for altering a course of said steel belt, wherein variables for altering the course of said steel belt include temperature-induced spacings measured by the path sensors, and wherein said pressure cylinder-piston arrangements alter the course of said steel belt in response to said temperature-induced spacings before the course of said steel belt is disrupted by said temperature-induced spacings.

6. The measuring and control device as claimed in claim 5, wherein the continuously operating press is firmly anchored to the foundation horizontally and positioned between two upper and two lower supporting girders.

7. The measuring and control device as claimed in claim 6, wherein the two lower supporting girders are mounted on sliding bodies.

8. The measuring and control device as claimed in claim 7, wherein the sliding bodies are a slidable material selected from the group consisting of plastic and grey cast iron having a high graphite content.

9. The measuring and control device as claimed in claim 5, further comprising:

second measuring columns respectively anchored in the foundation and spaced longitudinally from either longitudinal side of the other end face of the continuously operating press; and second path sensors disposed on the second measuring columns, each of the path sensors measuring a spacing from a point on the other end face of the continuously operating press, wherein variables for altering a course of said steel belt also include the spacings measured by the second path sensors.

10. A measuring and control device for guiding a steel belt along a longitudinal axis of a continuously operating press, comprising:

a driving drum and a reversing drum for guiding said steel belt;

first measuring columns respectively anchored in a foundation and spaced longitudinally from either longitudinal side of an end face of the continuously operating press;

first path sensors disposed on the measuring columns, each of the first path sensors measuring a spacing from a point on the continuously operating press;

second measuring columns respectively anchored in the foundation and spaced longitudinally from either longitudinal side of the other end face of the continuously operating press;

second path sensors disposed on the second measuring columns, each of the second path sensors measuring a spacing from a point on the other end face of the continuously operating press; and pressure cylinder-piston arrangements disposed on said driving drum and said reversing drum for altering a course of said steel belt, wherein variables for altering the course of said steel belt include the spacings measured by the first and second path sensors.

* * * * *